(12) United States Patent
Hagimoto et al.

(10) Patent No.: US 11,673,542 B2
(45) Date of Patent: Jun. 13, 2023

(54) CONTROLLER OF VEHICLE

(71) Applicant: TOYOTA JIDOSHA KABUSHIKI KAISHA, Toyota (JP)

(72) Inventors: Taiga Hagimoto, Mishima (JP); Hirotaka Saito, Sunto-gun (JP); Hideto Wakabayashi, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 228 days.

(21) Appl. No.: 17/039,094

(22) Filed: Sep. 30, 2020

(65) Prior Publication Data

US 2021/0171010 A1 Jun. 10, 2021

(30) Foreign Application Priority Data

Dec. 9, 2019 (JP) .............................. JP2019-222446

(51) Int. Cl.
| | |
|---|---|
| *B60W 20/10* | (2016.01) |
| *B60K 6/24* | (2007.10) |
| *B60K 6/26* | (2007.10) |
| *B60K 6/28* | (2007.10) |
| *B60L 15/20* | (2006.01) |

(Continued)

(52) U.S. Cl.
CPC .............. *B60W 20/10* (2013.01); *B60K 6/24* (2013.01); *B60K 6/26* (2013.01); *B60K 6/28* (2013.01); *B60L 15/20* (2013.01); *B60W 10/06* (2013.01); *B60W 10/08* (2013.01); *B60Y 2200/92* (2013.01); *B60Y 2300/60* (2013.01)

(58) Field of Classification Search
None
See application file for complete search history.

(56) References Cited

U.S. PATENT DOCUMENTS 8,138,712 B2 * 3/2012 Yamada ................... H02P 27/10
  318/434
8,324,856 B2 * 12/2012 Yamakawa ............ B60K 6/445
  318/82

(Continued)

FOREIGN PATENT DOCUMENTS

| JP | H06-178550 A | 6/1994 |
|---|---|---|
| JP | 2002-084790 A | 3/2002 |

(Continued)

OTHER PUBLICATIONS

EPO Search Opinion (Year: 2021).*

*Primary Examiner* — Dirk Wright
(74) *Attorney, Agent, or Firm* — Oliff PLC

(57) ABSTRACT

A controller is installed in a vehicle. The vehicle includes an engine, rotary electric machine for power generation, rotary electric machine for propulsion, power storage device, inverter for power generation, and inverter for propulsion. The controller includes a drive control changing unit that changes drive control of at least one of the rotary electric machine for power generation and the rotary electric machine for propulsion, for reduction of a total value of a power-generation-side ripple current generated according to an operating state of the rotary electric machine for power generation, and a drive-side ripple current generated according to the operating state of the rotary electric machine for propulsion, when the total value is equal to or larger than a preset threshold value.

7 Claims, 9 Drawing Sheets

(51) Int. Cl.
*B60W 10/06* (2006.01)
*B60W 10/08* (2006.01)

(56) References Cited

U.S. PATENT DOCUMENTS

| | | | |
|---|---|---|---|
| 8,760,097 B2 * | 6/2014 | Takamatsu | B60L 50/51 |
| | | | 318/400.26 |
| 10,425,032 B2 * | 9/2019 | Tapadia | B60L 50/51 |
| 2002/0027789 A1 | 3/2002 | Okushima et al. | |
| 2011/0006723 A1 | 1/2011 | Yamakawa et al. | |

FOREIGN PATENT DOCUMENTS

| | | | |
|---|---|---|---|
| JP | 2004112904 A * | 4/2004 | |
| JP | 2014-50303 A | 3/2014 | |
| JP | 2017-108546 A | 6/2017 | |
| WO | 2013/034965 A1 | 3/2013 | |

\* cited by examiner

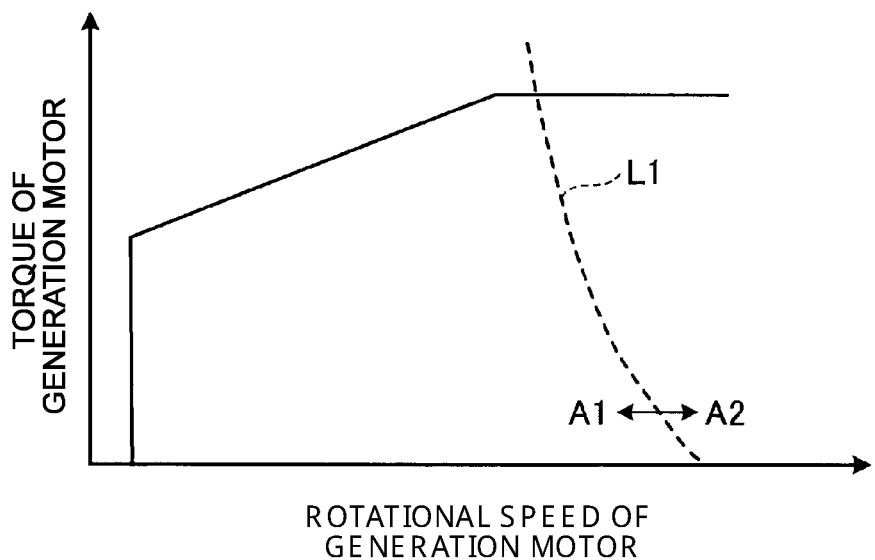
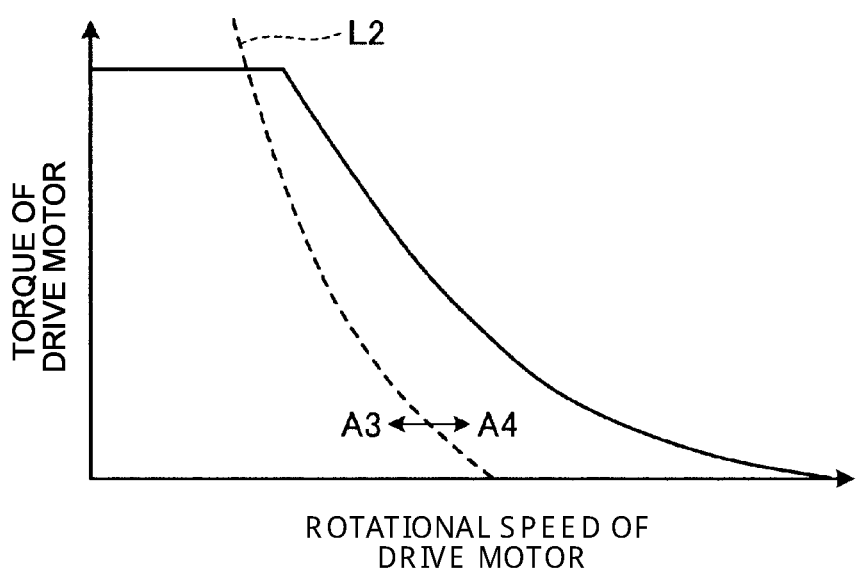

CONTROLLER OF VEHICLE

INCORPORATION BY REFERENCE

The disclosure of Japanese Patent Application No. 2019-222446 filed on Dec. 9, 2019 including the specification, drawings and abstract is incorporated herein by reference in its entirety.

BACKGROUND

1. Technical Field

The disclosure relates to a controller of a vehicle.

2. Description of Related Art

Hybrid vehicles on each of which an engine and a motor are installed as power sources are known. In the hybrid vehicles, direct-current (DC) power supplied from a battery as a power storage device is converted by an inverter into alternating-current (AC) power, which is then supplied to the motor, so as to drive the motor. When the DC power is converted by the inverter into the AC power, so as to drive the motor, switching of a plurality of switching devices provided in the inverter between ON and OFF is controlled at a given switching frequency; as a result, ripple current is generated according to the switching frequency, as known in the art. When the ripple current is supplied to a capacitor in a circuit that electrically connects the battery with the inverter, for example, heat is generated in the capacitor. In particular, the switching frequency depends on the rotational speed of the motor; therefore, if the switching frequency is included in a resonance frequency band of the capacitor, depending on the operating state of the motor, the ripple current supplied to the capacitor due to resonance is increased, and the amount of heat generated in the capacitor is increased.

According to a technology disclosed in Japanese Unexamined Patent Application Publication No. 06-178550 (JP 06-178550 A), ripple current is estimated from errors between command currents and measured currents, and the carrier frequency (switching frequency) of a VVVF (Variable Voltage Variable Frequency) inverter is changed, when the ripple current is equal to or larger than a predetermined value, so as to reduce the ripple current.

SUMMARY

As one type of the hybrid vehicle, a series hybrid vehicle on which an engine, a generation motor as a rotary electric machine for power generation, and a drive motor as a rotary electric machine for propulsion are installed is known. In the series hybrid vehicle, a battery is charged with electric power generated by driving the generation motor with output of the engine, for example, and the drive motor is driven with electric power from the battery, so as to propel the vehicle. Also, in the series hybrid vehicle, an inverter for power generation which converts AC power generated by the generation motor into DC power and supplies the DC power to the battery, and an inverter for propulsion which converts the DC power from the battery into AC power and supplies the AC power to the drive motor, are electrically connected to the battery, via a common circuit.

However, in the series hybrid vehicle, when the generation motor and the drive motor are driven at the same time, ripple current according to the switching frequency of the inverter for power generation, and ripple current according to the switching frequency of the inverter for propulsion, are generated. Thus, both of the ripple currents are supplied to a single capacitor provided in the common circuit, which may cause a problem that the amount of heat generated in the capacitor is increased, as compared with the case where only one of the ripple currents is supplied to the capacitor. In particular, when the respective switching frequencies of the inverter for power generation and the inverter for propulsion are included in the resonance frequency band of the capacitor, the above problem becomes more noticeable. In the battery that permits transfer of electric power between the generation motor and the drive motor, too, the amount of heat generated may be undesirably increased due to the ripple current.

This disclosure provides a controller of a vehicle which can reduce heat generated in a constituent element or elements of a circuit due to ripple current, when a rotary electric machine for power generation and a rotary electric machine for propulsion are driven at the same time.

One aspect of the disclosure is concerned with a controller installed on a vehicle including an engine, a first rotary electric machine for power generation which generates electric power using driving force from the engine, a second rotary electric machine for propulsion which delivers driving force for driving drive wheels, a power storage device, a first inverter for power generation which performs conversion of electric power between the first rotary electric machine and the power storage device, a second inverter for propulsion which performs conversion of electric power between the second rotary electric machine and the power storage device, and a circuit that has at least a capacitor and electrically connects the first inverter and the second inverter to the power storage device. The controller is adapted to perform drive control on the first rotary electric machine and the second rotary electric machine. The controller includes a drive control changing unit configured to, when a total value of a power-generation-side ripple current and a drive-side ripple current is equal to or larger than a preset threshold value, change drive control of at least one of the first rotary electric machine and the second rotary electric machine such that the total value is reduced. The power-generation-side ripple current is generated according to an operating state of the first rotary electric machine, and the drive-side ripple current is generated according to the operating state of the second rotary electric machine.

In the controller according to the above aspect of the disclosure, the drive control changing unit changes drive control of at least one of the first rotary electric machine for power generation and the second rotary electric machine for propulsion, so as to reduce the total value. In this manner, the controller makes it possible to reduce at least one of ripple current on the power generation side and ripple current on the drive side, so as to reduce the total value of the power-generation-side ripple current and the drive-side ripple current. As a result, the controller according to the disclosure can reduce heat generated due to the ripple current, when the first rotary electric machine and the second rotary electric machine are driven at the same time.

In the controller as described above, the drive control changing unit may be configured to change the drive control of the first rotary electric machine such that the total value is reduced, when the total value is equal to or larger than the threshold value.

With the above configuration, the controller can reduce the total value of the power-generation-side ripple current and the drive-side ripple current, while preventing traveling of the vehicle from being influenced by otherwise possible change of drive control of the second rotary electric machine for propulsion.

In the controller as described above, the drive control changing unit may be operable to change a control mode of switching control of the first inverter between a rectangular wave control mode and a pulse width modulation control mode according to a rotational speed of the first rotary electric machine, and the drive control changing unit may be operable to change a control mode of switching control of the second inverter between the rectangular wave control mode and the pulse width modulation control mode according to the rotational speed of the second rotary electric machine. When the switching control of the first inverter and the switching control of the second inverter are both performed in the same control mode, the drive control changing unit may be configured to change one of the control mode of the switching control of the first inverter, and the control mode of the switching control of the second inverter, such that the control mode of the first inverter does not match the control mode of the second inverter.

With the above configuration, the controller can curb increase of the power-generation-side ripple current or the drive-side ripple current due to resonance, and thus reduce the total value of the power-generation-side ripple current and the drive-side ripple current, by changing the switching frequency of the first inverter, which depends on the rotational speed of the first rotary electric machine, or the switching frequency of the second inverter, which depends on the rotational speed of the second rotary electric machine.

In the controller as described above, the drive control changing unit may be configured to change the control mode of the switching control of the first inverter to the pulse width modulation control mode, when the switching control of the first inverter and the switching control of the second inverter are both performed in the rectangular wave control mode, and the drive control changing unit may be configured to change the control mode of the switching control of the first inverter to the rectangular wave control mode, when the switching control of the first inverter and the switching control of the second inverter are both performed in the pulse width modulation control mode.

With the above configuration, the controller can curb increase of the power-generation-side ripple current due to resonance, and reduce the total value of the power-generation-side ripple current and the drive-side ripple current, by changing the switching frequency of the first inverter, which depends on the rotational speed of the first rotary electric machine, while preventing traveling of the vehicle from being influenced by otherwise possible change of drive control of the second rotary electric machine.

In the controller as described above, the drive control changing unit may be configured to change drive control of only the second rotary electric machine such that the total value is reduced, when a remaining capacity of the power storage device is smaller than a predetermined value.

With the above configuration, the controller can reduce the total value of the power-generation-side ripple current and the drive-side ripple current, while curbing a shortage of the remaining capacity of the power storage device required to enable the vehicle to travel with driving force from the second rotary electric machine.

In the controller as described above, the drive control changing unit may be configured to change an operating point of the second rotary electric machine such that driving force is reduced.

With the above configuration, the controller can curb a shortage of the remaining capacity of the power storage device required to enable the vehicle to travel with driving force from the second rotary electric machine.

In the controller as described above, the drive control changing unit may be configured to prioritize change of drive control of the first rotary electric machine over change of drive control of the second rotary electric machine.

With this configuration, traveling of the vehicle is less likely or unlikely to be influenced by change of the drive control.

The controller as described above may further include a power-generation-side map representing a relationship between an operating point of the first rotary electric machine and the power-generation-side ripple current, a drive-side map representing a relationship between an operating point of the second rotary electric machine and the drive-side ripple current, and an estimating unit. The estimating unit may be configured to estimate the power-generation-side ripple current from the power-generation-side map, based on the operating point of the first rotary electric machine, and estimate the drive-side ripple current from the drive-side map, based on the operating point of the second rotary electric machine. The drive control changing unit may be configured to use the power-generation-side ripple current and the drive-side ripple current estimated by the estimating unit.

With the above configuration, the controller can easily estimate the power-generation-side ripple current and the drive-side ripple current, from the operating states (operating points) of the first rotary electric machine and the second rotary electric machine, and the power-generation-side map and the drive-side map. Also, there is no need to provide dedicated current sensors for measuring the power-generation-side ripple current and the drive-side ripple current, thus making it possible to reduce the cost and save space.

In the controller according to the above aspect of the disclosure, the drive control changing unit changes drive control of at least one of the first rotary electric machine for power generation and the second rotary electric machine for propulsion, so as to reduce the total value of the power-generation-side ripple current and the drive-side ripple current. Thus, the controller can reduce the total value of the power-generation-side ripple current and the drive-side ripple current, by reducing at least one of the power-generation-side ripple current and the drive-side ripple current. Thus, the controller according to the disclosure yields an effect of reducing heat generated due to the ripple current, when the rotary electric machine for power generation and the rotary electric machine for propulsion are driven at the same time.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a view indicating the correspondence relationship between an operating point of a generation motor, and a switching control mode of an inverter for power generation;

FIG. 3 is a view indicating the correspondence relationship between an operating point of a drive motor, and a switching control mode of an inverter for propulsion;

DETAILED DESCRIPTION OF EMBODIMENTS

A controller of a hybrid vehicle according to one embodiment of the disclosure will be described. It is to be understood that the disclosure is not limited by this embodiment.

Figure 1:
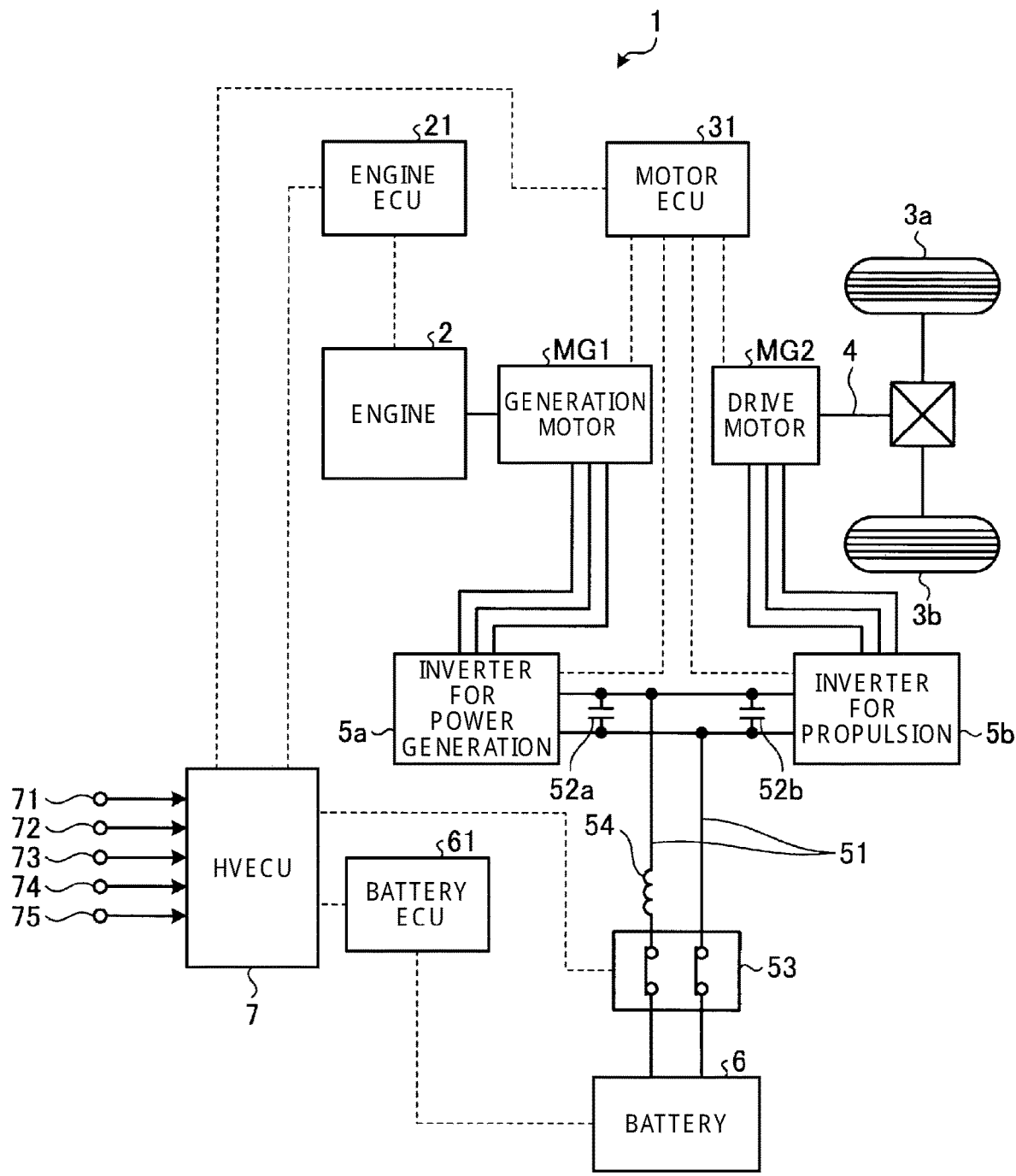
FIG. 1 is a schematic view showing the configuration of a hybrid vehicle according to one embodiment.

FIG. 1 shows the configuration of a hybrid vehicle 1 according to this embodiment. As shown in FIG. 1, the hybrid vehicle 1 according to this embodiment is configured as a so-called series hybrid automobile in which a generation motor MG1 as a motor for power generation is connected to an output shaft of an engine 2, and a drive motor MG2 as a motor for propelling the vehicle is connected to a drive shaft 4 coupled to drive wheels 3a, 3b. More specifically, the hybrid vehicle 1 includes the engine 2, the generation motor MG1, the drive motor MG2, an inverter 5a for power generation, an inverter 5b for propulsion, a battery 6, and a hybrid vehicle electronic control unit (which will be referred to as "HVECU") 7, as main constituent elements.

The engine 2 comprises an internal combustion engine that delivers power, using gasoline, light oil, or the like, as a fuel. The engine 2 operates under control of an engine electronic control unit (which will be referred to as "engine ECU") 21. The engine ECU 21 comprises a microprocessor, and includes a central processing unit (CPU), read-only memory (ROM) that stores control programs, random access memory (RAM) that temporarily stores data, input-output port, communication port, and so forth. The engine ECU 21 is connected to the HVECU 7 via the communication port.

The generation motor MG1 comprises a synchronous generator-motor, and its rotor is connected to an output shaft of the engine 2. The drive motor MG2 comprises a synchronous generator-motor, and its rotor is connected to the drive shaft 4. The inverter 5a for power generation and the inverter 5b for propulsion are connected to the generation motor MG1 and the drive motor MG2, respectively, and are electrically connected to the battery 6, via a common circuit. The common circuit includes a power line 51, smoothing capacitor 52a on the power generation side, smoothing capacitor 52b on the propulsion side, system main relay device 53, and reactor 54. The reactor 54 is connected in series to the power line 51. In the following description, the capacitor 52a and the capacitor 52b will be simply referred to as "capacitor 52", when they are not particularly distinguished from each other. The generation motor MG1 and the drive motor MG2 are rotated/driven, under control of a motor electronic control unit (which will be referred to as "motor ECU") 31, which controls switching of a plurality of switching devices included in the inverter 5a for power generation and the inverter 5b for propulsion. The motor ECU 31 comprises a microprocessor, like the engine ECU 21. The motor ECU 31 is connected to the HVECU 7 via the communication port.

The battery 6 comprises a lithium-ion secondary battery or a nickel-hydrogen secondary battery, and is connected to the inverter 5a for power generation and the inverter 5b for propulsion, via the power line 51. The battery 6 is managed by a battery electronic control unit (which will be referred to as "battery ECU") 61. The battery ECU 61 comprises a microprocessor, like the engine ECU 21. The battery ECU 61 is connected to the HVECU 7 via the communication port. The battery ECU 61 receives signals used for managing the battery 6, from various sensors. The signals received by the battery ECU 61 include, for example, a signal concerning the voltage of the battery 6 from a voltage sensor (not shown), and a signal concerning the current of the battery 6 from a current sensor (not shown). The battery ECU 61 computes the remaining capacity (which will be referred to as "SOC" (state of charge)) of the battery 6, based on an integrated value of the current of the battery 6 from the current sensor, for example.

The HVECU 7 comprises a microprocessor, like the engine ECU 21. The HVECU 7 receives signals from various sensors, via an input port. The signals received by the HVECU 7 include, for example, an ignition signal from an ignition switch 71, engine speed signal from an engine speed sensor 72 that detects the rotational speed of the engine 2, accelerator position signal from an accelerator pedal position sensor 73 that detects the amount of depression of an accelerator pedal, brake pedal position signal from a brake pedal position sensor 74 that detects the amount of depression of a brake pedal, vehicle speed signal from a vehicle speed sensor 75, and so forth. The HVECU 7 is connected to the engine ECU 21, motor ECU 31, and battery ECU 61, via a communication port.

In the hybrid vehicle 1 according to this embodiment, the switching control for switching the switching devices provided in the inverter 5a for power generation between ON and OFF is selectively changed according to the rotational speed of the generation motor MG1, between a pulse width modulation (PWM) control mode (pulse width control mode), and a rectangular wave control mode.

In the PWM control mode, one of sine-wave PWM control and overmodulation PWM control is performed. Under the sine-wave PWM control which is used as a general PWM control method, switching of the switching devices on each-phase arm of the inverter 5a for power generation, between ON and OFF, is controlled according to voltage comparison between a sinusoidal voltage command value and a carrier wave (carrier signal). As a result, a fundamental wave component of the voltage applied from the inverter 5a for power generation to the generation motor MG1 within a given period becomes a pseudo sine wave. Under the overmodulation PWM control, PWM control similar to the sine-wave PWM control is performed, after the carrier wave (carrier signal) is distorted so that its amplitude is reduced. Then, in a region where the PWM control is performed, the sine-wave PWM control is performed when the rotational speed of the generation motor MG1 is relatively small, and the overmodulation PWM control is performed when the rotational speed of the generation motor MG1 is relatively high.

In the rectangular wave control mode, rectangular wave control is performed. Under the rectangular wave control, switching control is performed at a pace of once in the given period. As a result, the voltage applied from the inverter 5a for power generation to the generation motor MG1 in the given period becomes a rectangular-wave voltage corresponding to one pulse. Thus, the rectangular wave control is inferior to the PWM control in terms of the control accuracy (control response), but makes it possible to increase the modulation factor to be higher than that of the PWM control mode, and thus increase the motor output.

In the hybrid vehicle 1 according to this embodiment, the motor ECU 31 selects one of the PWM control mode and the rectangular wave control mode, according to a region to which an operating point of the generation motor MG1 belongs, in view of differences between respective characteristics of the PWM control mode and the rectangular wave control mode. The operating point of the generation motor MG1 is determined by the rotational speed of the generation motor MG1, and torque of the generation motor MG1.

FIG. 2 shows the correspondence relationship between the operating point of the generation motor MG1 and the switching control mode of the inverter 5a for power generation. In FIG. 2, the horizontal axis indicates the rotational speed of the generation motor MG1, and the vertical axis indicates the torque of the generation motor MG1. When the operating point of the generation motor MG1 is located in a PWM control mode region A1 on the lower rotational speed side of a control boundary line L1 shown in FIG. 2, the motor ECU 31 selects the PWM control mode having relatively good controllability so as to reduce torque variation. Also, when the operating point of the generation motor MG1 is located in a rectangular wave control mode region A2 on the higher rotational speed side of the control boundary line L1, the motor ECU 31 selects the rectangular wave control mode so as to improve the output of the generation motor MG1.

In the hybrid vehicle 1 according to this embodiment, the motor ECU 31 also selectively changes the switching control mode of the inverter 5b for propulsion, between the PWM control mode and the rectangular wave control mode, according to the rotational speed of the drive motor MG2, as is the case with the switching control mode of the inverter 5a for power generation. Namely, the motor ECU 31 selects the switching control mode of the inverter 5b for propulsion, according to a region to which the operating point of the drive motor MG2 determined by the rotational speed of the drive motor MG2 and torque of the drive motor MG2 belongs.

FIG. 3 shows the correspondence relationship between the operating point of the drive motor MG2 and the switching control mode of the inverter 5b for propulsion. In FIG. 3, the horizontal axis indicates the rotational speed of the drive motor MG2, and the vertical axis indicates the torque of the drive motor MG2. When the operating point of the drive motor MG2 is located in a PWM control mode region A3 on the lower rotational speed side of a control boundary line L2 shown in FIG. 3, the motor ECU 31 selects the PWM control mode. Also, when the operating point of the drive motor MG2 is located in a rectangular wave control mode region A4 on the higher rotational speed side of the control boundary line L2, the motor ECU 31 selects the rectangular wave control mode.

Figure 4:
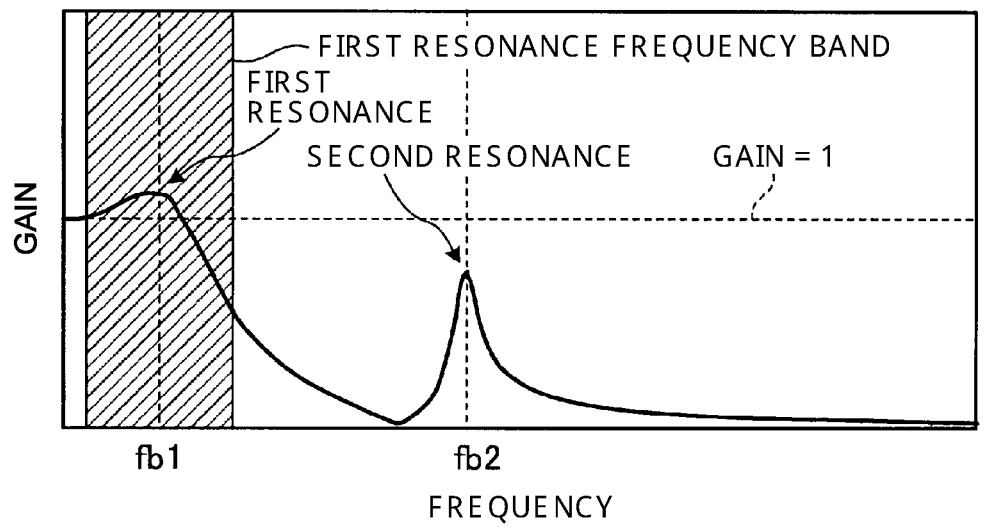
FIG. 4 is a graph indicating the resonance frequencies of a battery.

The graph of FIG. 4 indicates the resonance frequency of the battery 6. As shown in FIG. 4, the battery 6 has two resonance frequencies, i.e., a first resonance frequency fb1 of first resonance, and a second resonance frequency fb2 (>fb1) of second resonance on the higher frequency side of the first resonance. Also, as is understood from FIG. 4, the gain of the first resonance is higher than one, and the gain of the second resonance is lower than one. A hatched region in FIG. 4 is a first resonance frequency band in which the first resonance appears in the battery 6.

Figure 5:
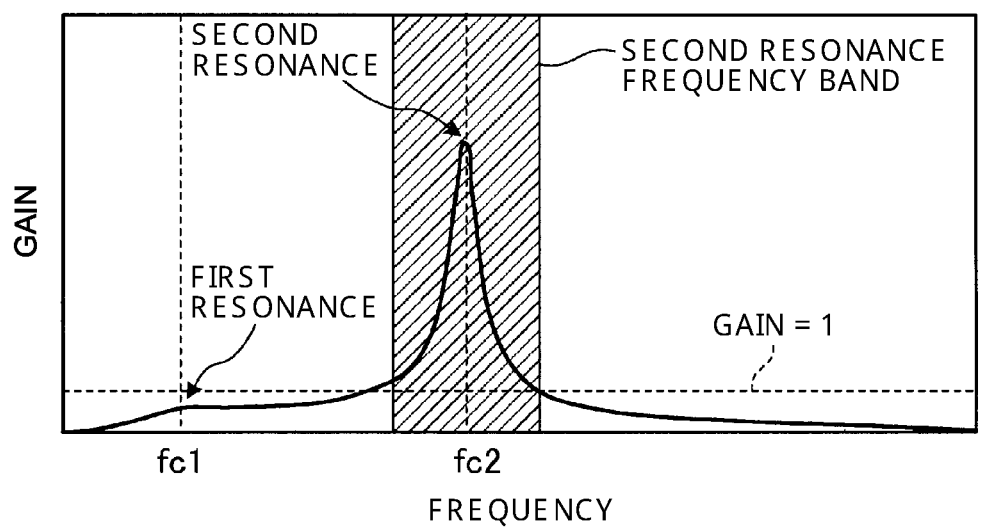
FIG. 5 is a graph indicating the resonance frequencies of a capacitor.

The graph of FIG. 5 indicates the resonance frequency of the capacitor 52. As shown in FIG. 5, the capacitor 52 has two resonance frequencies, i.e., a first resonance frequency fc1 of first resonance, and a second resonance frequency fc2 (>fc1) of second resonance. As is understood from FIG. 5, the gain at the first resonance frequency fc1 is lower than one, and the gain at the second resonance frequency fc2 is higher than one. A hatched region in FIG. 5 is a second resonance frequency band in which the second resonance appears in the capacitor 52.

As shown in FIG. 4 and FIG. 5, each of the battery 6 and the capacitor 52 has two resonance frequencies of the first resonance and second resonance, but the gains of the first resonance and second resonance of the battery 6 have different trends or characteristics from those of the capacitor 52.

In this embodiment, when switching control is respectively performed on the inverter 5a for power generation and the inverter 5b for propulsion in the rectangular wave control mode, the respective switching frequencies of the inverter 5a for power generation and the inverter 5b for propulsion are likely to be included in the first resonance frequency band. Also, in this embodiment, when switching control is respectively performed on the inverter 5a for power generation and the inverter 5b for propulsion in the PWM control mode, the respective switching frequencies of the inverter 5a for power generation and the inverter 5b for propulsion are likely to be included in the second resonance frequency band.

Thus, since the respective switching frequencies of the inverter 5a for power generation and the inverter 5b for propulsion are included in the first resonance frequency band of the battery 6 in FIG. 4, the first resonance is generated, and ripple current is significantly increased in the battery 6. Also, when the respective switching frequencies of the inverter 5a for power generation and the inverter 5b for propulsion are included in the second resonance frequency band of the capacitor 52 in FIG. 5, the second resonance is generated, and ripple current is significantly increased in the capacitor 52.

Here, it is possible to avoid resonance in the battery 6 and the capacitor 52, by making the respective switching frequencies of the inverter 5a for power generation and the inverter 5b for propulsion higher than the respective second resonance frequency bands of the battery 6 and the capacitor 52. Meanwhile, where the performance of the switching devices of each of the inverter 5a for power generation and the inverter 5b for propulsion, and the performance of a microcomputer, etc. that constitutes the motor ECU 31, are not sufficient, it is difficult to make the switching frequencies higher than the second resonance frequency bands.

Figure 6:
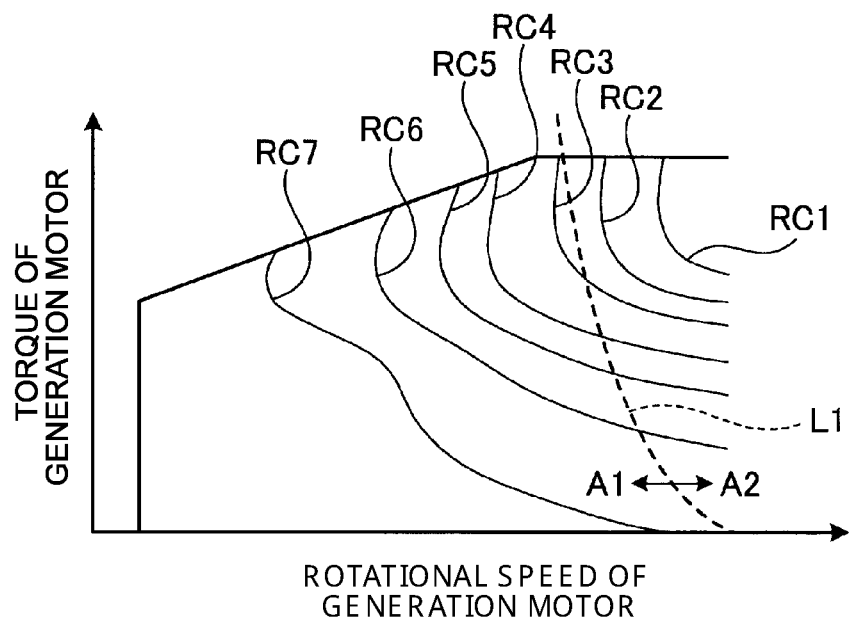
FIG. 6 is a view showing a power-generation-side map representing the correspondence relationship between the operating point of the generation motor and ripple current of the battery.

FIG. 6 shows a power-generation-side map representing the correspondence relationship between the operating point of the generation motor MG1, and the ripple current of the battery 6. The HVECU 7 has the power-generation-side map representing the correspondence relationship between the operating point of the generation motor MG1, and the ripple current of the battery 6, as shown in FIG. 6. In FIG. 6, curves RC1 to RC7 define ranges in each of which the amount of the ripple current is substantially equal. In FIG. 6, the amount of the ripple current changes stepwise over the ranges of the ripple current, such that the amount of the ripple current is largest in a range on the right-hand side of the curve RC1, and the amount of the ripple current is smallest in a range on the left-hand side of the curve RC7. As is understood from FIG. 6, when the operating point of the generation motor MG1 is within the rectangular wave control mode region A2, and the torque of the motor MG1 is relatively high, the ripple current of the battery 6 depending on the operating state of the generation motor MG1 becomes large.

Figure 7:
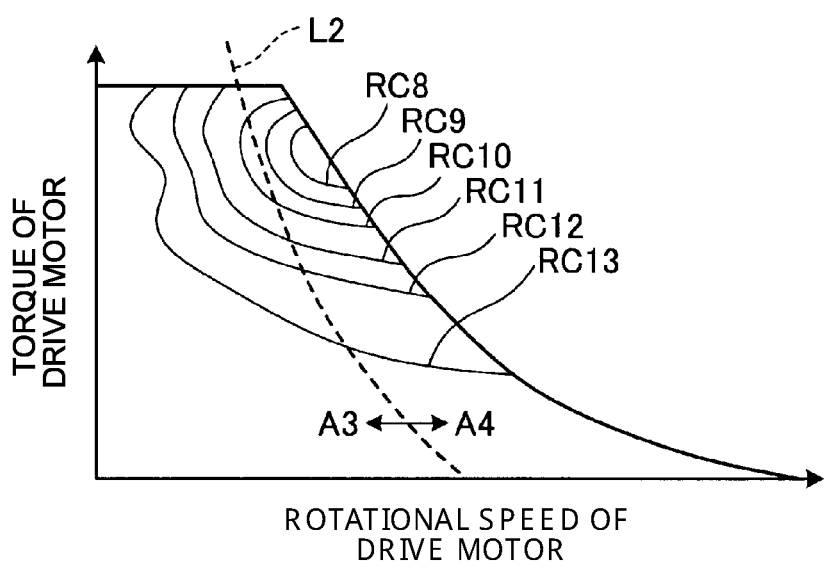
FIG. 7 is a view showing a drive-side map representing the correspondence relationship between the operating point of the drive motor and ripple current of the battery.

FIG. 7 shows a drive-side map representing the correspondence relationship between the operating point of the drive motor MG2, and the ripple current of the battery 6. The HVECU 7 has the drive-side map representing the correspondence relationship between the operating point of the drive motor MG2 and the ripple current of the battery 6, as shown in FIG. 7. In FIG. 7, curves RC8 to RC13 define ranges in each of which the amount of the ripple current is substantially equal. In FIG. 7, the amount of the ripple current changes stepwise over the ranges of the ripple current, such that the amount of the ripple current is largest in a range on the right-hand side of the curve RC8, and the amount of the ripple current is smallest in a range on the left-hand side of the curve RC13. As is understood from FIG. 7, when the operating point of the drive motor MG2 is within the rectangular wave control mode region A4, and the torque of the motor MG2 is relatively high, the ripple current of the battery 6 depending on the operating state of the drive motor MG2 becomes large.

Figure 8:
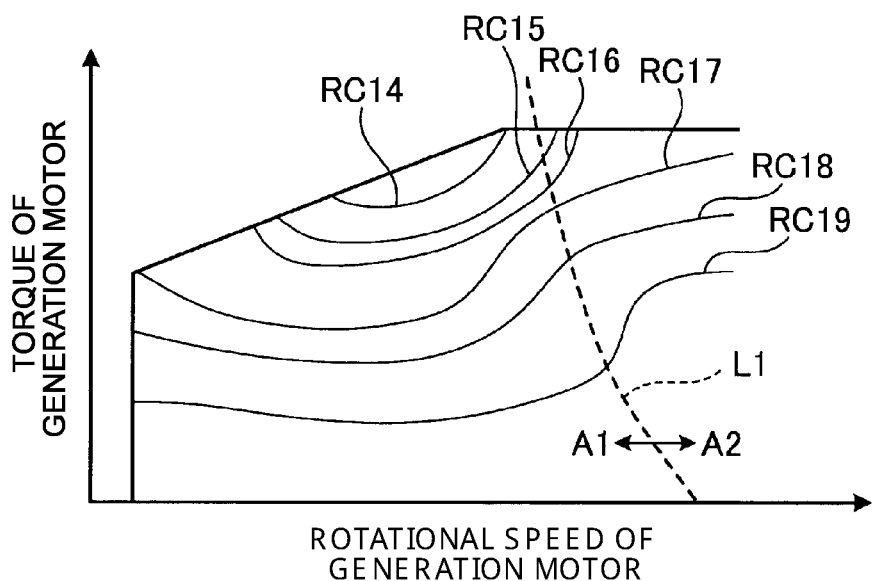
FIG. 8 is a view showing a power-generation-side map representing the correspondence relationship between the operating point of the generation motor and ripple current of the capacitor.

FIG. 8 shows a power-generation-side map representing the correspondence relationship between the operating point of the generation motor MG1, and the ripple current of the capacitor 52. The HVECU 7 has the power-generation-side map representing the correspondence relationship between the operating point of the generation motor MG1, and the ripple current of the capacitor 52, as shown in FIG. 8. In FIG. 8, curves RC14 to RC19 define ranges in each of which the amount of the ripple current is substantially equal. In FIG. 8, the amount of the ripple current changes stepwise over the ranges of the ripple current, such that the amount of the ripple current is largest in a range on the upper side of the curve RC14, and the amount of the ripple current is smallest in a range on the lower side of the curve RC19. As is understood from FIG. 8, when the operating point of the generation motor MG1 is within the PWM control mode region A1, and the torque of the motor MG1 is relatively high, the ripple current of the capacitor 52 depending on the operating state of the generation motor MG1 becomes large.

Figure 9:
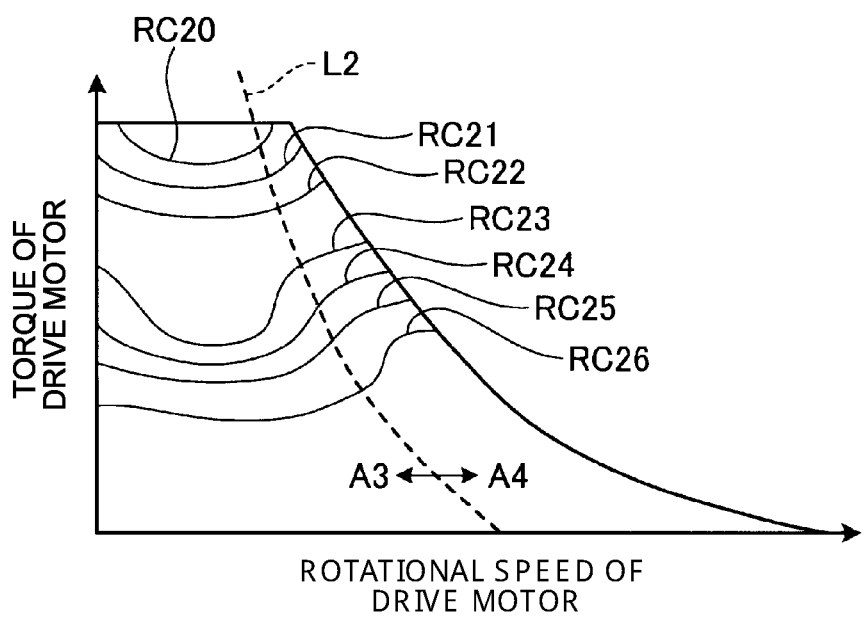
FIG. 9 is a view showing a drive-side map representing the correspondence relationship between the operating point of the drive motor and ripple current of the capacitor.

FIG. 9 shows a drive-side map representing the correspondence relationship between the operating point of the drive motor MG2, and the ripple current of the capacitor 52. The HVECU 7 has the drive-side map representing the correspondence relationship between the operating point of the drive motor MG2 and the ripple current of the capacitor 52, as shown in FIG. 9. In FIG. 9, curves RC20 to RC26 define ranges in each of which the amount of the ripple current is substantially equal. In FIG. 9, the amount of the ripple current changes stepwise over the ranges of the ripple current, such that the amount of the ripple current is largest in a range on the upper side of the curve RC20, and the amount of the ripple current is smallest in a range on the lower side of the curve RC26. As is understood from FIG. 9, when the operating point of the drive motor MG2 is within the PWM control mode region A3, and the torque of the motor MG2 is relatively high, the ripple current of the capacitor 52 depending on the operating state of the drive motor MG2 becomes large.

In this embodiment, the power-generation-side maps and drive-side maps corresponding to the battery 6 and the capacitor 52, respectively, as shown in FIG. 6 to FIG. 9, are obtained in advance by experiment, or the like, and stored in a ROM provided in the HVECU 7. Then, the HVECU 7 functions as an estimating unit that estimates power-generation-side ripple currents in the battery 6 and the capacitor 52 from the respective power-generation-side maps, based on the operating point of the generation motor MG1, and estimates drive-side ripple currents in the battery 6 and the capacitor 52 from the respective drive-side maps, based on the operating point of the drive motor MG2. Thus, the power-generation-side ripple current and the drive-side ripple current can be easily estimated, from the operating states (operating points) of the generation motor MG1 and drive motor MG2, and the power-generation-side maps and drive-side maps. Also, there is no need to provide dedicated current sensors for measuring the power-generation-side ripple current and the drive-side ripple current, thus making it possible to reduce the cost and save space. The estimating unit may be provided in a controller different from the HVECU 7. In this embodiment, the HVECU 7 changes drive control of at least one of the generation motor MG1 and the drive motor MG2, using the power-generation-side ripple current and drive-side ripple current estimated by use of the power-generation-side map and drive-side map, so that the total value of the power-generation-side ripple current and drive-side ripple current is reduced.

Figure 10:
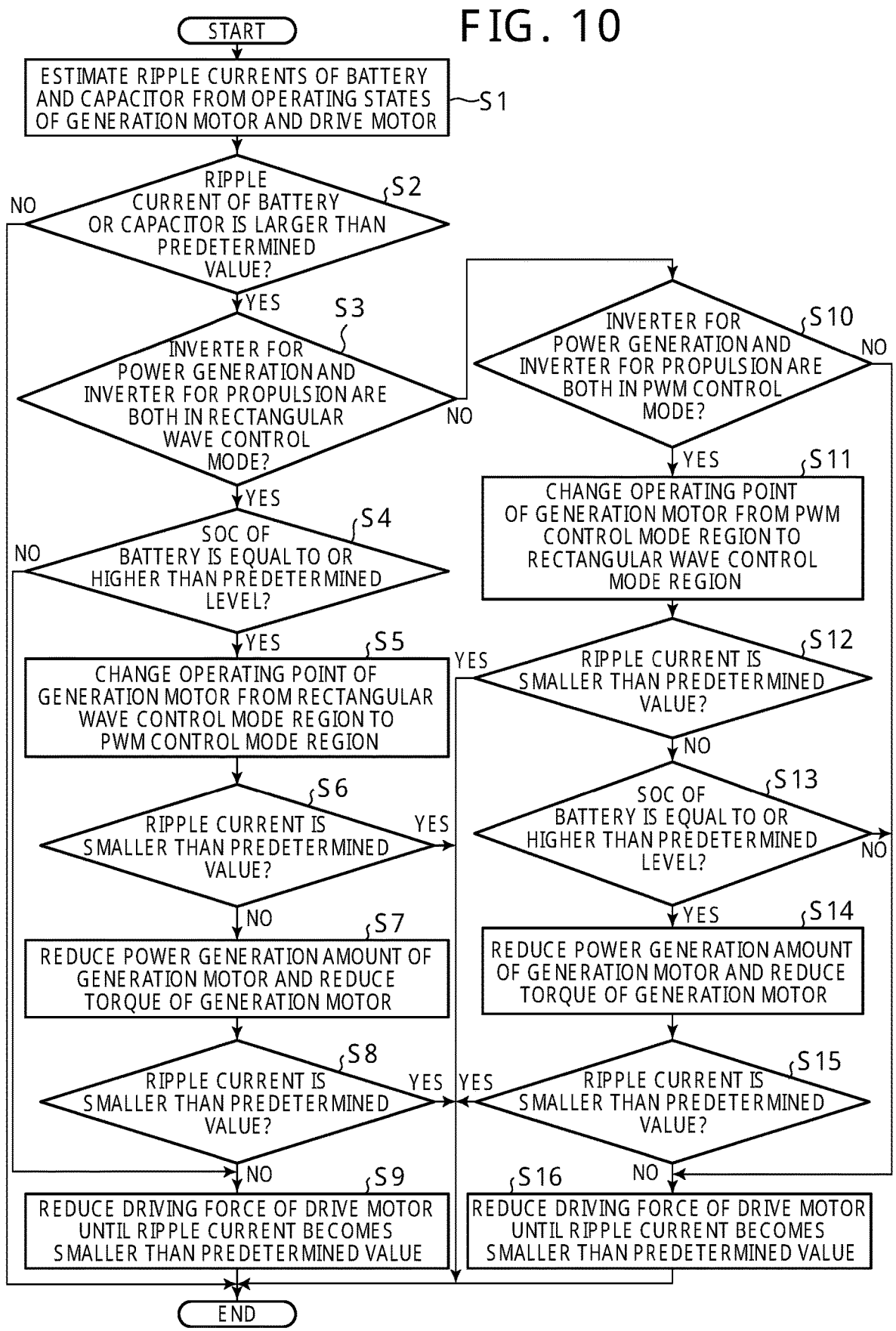
FIG. 10 is a flowchart illustrating one example of a control routine executed by a hybrid-vehicle electronic control unit (HVECU) of the hybrid vehicle according to the embodiment.

FIG. 10 is a flowchart illustrating one example of a control routine performed by the HVECU 7 of the hybrid vehicle 1 according to the embodiment.

Initially, the HVECU 7 estimates the respective ripple currents of the battery 6 and the capacitor 52, from the respective operating states of the generation motor MG1 and drive motor MG2 (step S1). For example, the HVECU 7 has the maps as shown in FIG. 6 to FIG. 9, which represent the correspondence relationships between the respective operating points of the generation motor MG1 and drive motor MG2, and the respective ripple currents of the battery 6 and capacitor 52. Then, the HVECU 7 estimates the power-generation-side ripple current generated according to the operating state of the generation motor MG1, and the drive-side ripple current generated according to the operating state of the drive motor MG2, with respect to the battery 6, from the respective operating points of the generation motor MG1 and drive motor MG2, and the above-indicated maps. Similarly, the HVECU 7 estimates the power-generation-side ripple current generated according to the operating state of the generation motor MG1, and the drive-side ripple current generated according to the operating state of the drive motor MG2, with respect to the capacitor 52, from the respective operating points of the generation motor MG1 and drive motor MG2, and the above-indicated maps.

Then, the HVECU 7 determines whether the ripple current of the battery 6 or the capacitor 52 is equal to or larger than a predetermined value (step S2). For example, the HVECU 7 determines, with respect to the battery 6, whether the total value of the power-generation-side ripple current and the drive-side ripple current is equal to or larger than a preset threshold value of ripple current in the battery 6. Similarly, the HVECU 7 determines, with respect to the capacitor 52, whether the total value of the power-generation-side ripple current and the drive-side ripple current is equal to or larger than a preset threshold value of ripple current in the capacitor 52.

Figure 11:
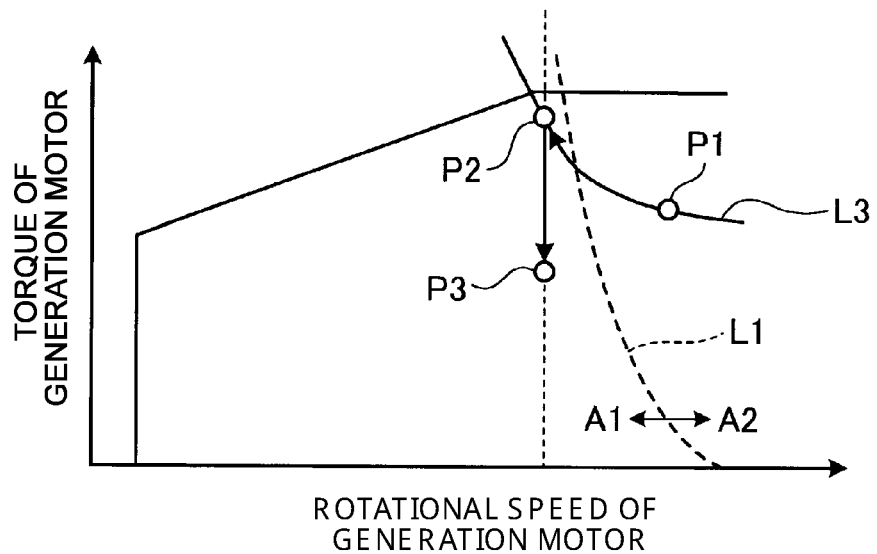
FIG. 11 is a view showing an operating point map of the generation motor when the operating point is located in a rectangular wave control mode region.
Figure 12:
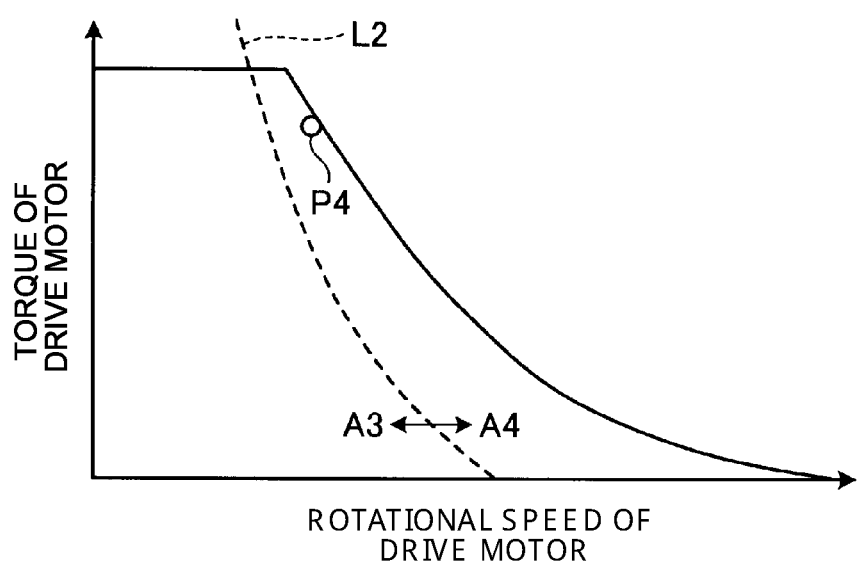
FIG. 12 is a view showing an operating point map of the drive motor when the operating point is located in the rectangular wave control mode region.

When the HVECU 7 determines that the ripple current of the battery 6 or the capacitor 52 is not equal to nor larger than the predetermined value (NO in step S2), it finishes the control routine of FIG. 10. On the other hand, when the HVECU 7 determines that the ripple current of the battery 6 or the capacitor 52 is equal to or larger than the predetermined value (YES in step S2), it determines whether both of the inverter 5a for power generation and the inverter 5b for propulsion are in the rectangular wave control mode (step S3). For example, the HVECU 7 determines whether the operating point P1 of the generation motor MG1 is located in the rectangular wave control mode region A2, as shown in FIG. 11, and the operating point P4 of the drive motor MG2 is located in the rectangular wave control mode region A4, as shown in FIG. 12.

When the inverter 5a for power generation and the inverter 5b for propulsion are both in the rectangular wave control mode (YES in step S3), the HVECU 7 determines whether the SOC of the battery 6 is equal to or higher than a predetermined level (step S4). When the HVECU 7 determines that the SOC of the battery 6 is equal to or higher than the predetermined level (YES in step S4), the amount of electric power generated by the generation motor MG1 may be changed, without causing a problem in traveling of the hybrid vehicle 1. Thus, the HVECU 7 changes the operating point of the generation motor MG1 from the rectangular wave control mode region to the PWM control mode region (step S5). For example, as shown in FIG. 11, the HVECU 7 changes the operating point P1 of the generation motor MG1 located in the rectangular wave control mode region A2, to an operating point P2 located in the PWM control mode region A1, along an equi-power curve L3.

When the inverter 5a for power generation and the inverter 5b for propulsion are both in the rectangular wave control mode, the respective switching frequencies of the inverter 5a for power generation and the inverter 5b for propulsion are highly likely to be included in the first resonance frequency band of the battery 6, and the ripple current (the total value of the power-generation-side ripple amount and the drive-side ripple amount) of the battery 6 is highly likely to be equal to or larger than the predetermined value. Thus, the HVECU 7 changes the operating point P1 of the generation motor MG1 located in the rectangular wave control mode region A2, to the operating point P2 located in the PWM control mode region A1, so as to change the switching frequency of the inverter 5a for power generation, and prevent it from being included in the first resonance frequency band of the battery 6. This makes it possible to curb increase of the power-generation-side ripple current due to resonance, and reduce the power-generation-side ripple current as compared with the case where the generation motor MG1 is operated at the operating point P1, thereby to reduce the ripple current of the battery 6, without changing drive control (the switching control mode) of the drive motor MG2, to change driving force delivered from the drive motor MG2, which would affect traveling of the hybrid vehicle 1.

Then, the HVECU 7 determines whether the ripple current of each of the battery 6 and the capacitor 52 has become smaller than the predetermined value, in the same manner as in step S1 and step S2 (step S6). When the HVECU 7 determines that the ripple current of each of the battery 6 and the capacitor 52 has become smaller than the predetermined value (YES in step S6), it finishes the control routine.

When the HVECU 7 determines that the ripple current of each of the battery 6 and the capacitor 52 has not become smaller than the predetermined value (NO in step S6), it reduces the amount of electric power generated by the generation motor MG1, and reduce the torque of the generation motor MG1 (step S7). For example, as shown in FIG. 11, the HVECU 7 changes the operating point P2 of the generation motor MG1 located in the PWM control mode region A1, to an operating point P3, by reducing the torque without changing the rotational speed. As a result, the amount of electric power generated by the generation motor MG1 is reduced, as compared with the case where the generation motor MG1 is operated at the operating point P2, and the power-generation-side ripple current can be reduced by an amount corresponding to reduction of the power generated, so that the ripple current of each of the battery 6 and the capacitor 52 can be reduced.

Then, the HVECU 7 determines whether the ripple current of each of the battery 6 and the capacitor 52 has become smaller than the predetermined value, in the same manner as in step S1 and step S2, for example (step S8). When the HVECU 7 determines that the ripple current of each of the battery 6 and the capacitor 52 has become smaller than the predetermined value (YES in step S8), it finishes the control routine. On the other hand, when the HVECU 7 determines in step S8 that the ripple current of each of the battery 6 and the capacitor 52 has not become smaller than the predetermined value (NO in step S8), it changes the operating point of the drive motor MG2 to reduce the driving force until the ripple current of each of the battery 6 and the capacitor 52 becomes smaller than the predetermined value (step S9), and finishes the control routine.

When the HVECU 7 determines in step S4 that the SOC of the battery 6 is not equal to nor higher than the predetermined level (NO in step S4), it reduces the driving force by changing the operating point of the drive motor MG2 until the ripple current of each of the battery 6 and the capacitor 52 becomes smaller than the predetermined value (step S9), and finishes the control routine.

Figure 13:
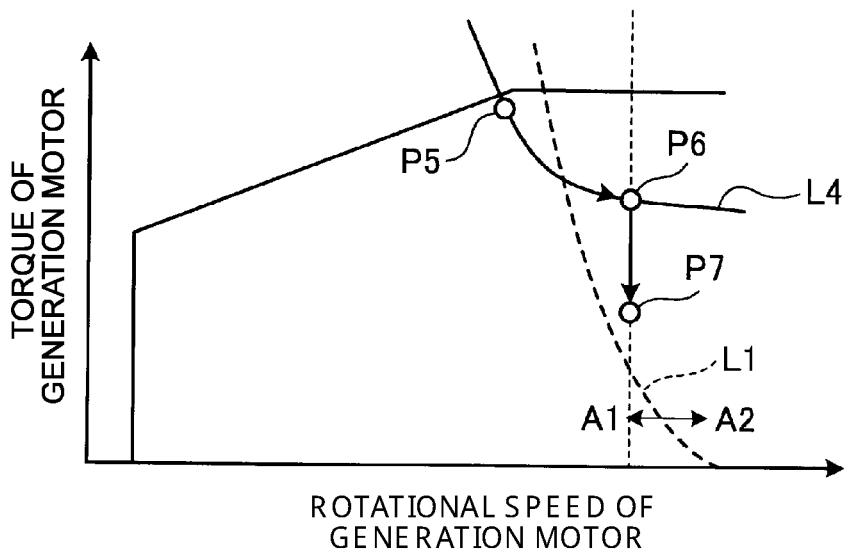
FIG. 13 is a view showing an operating point map of the generation motor when the operating point is located in a pulse width modulation (PWM) control mode region.
Figure 14:
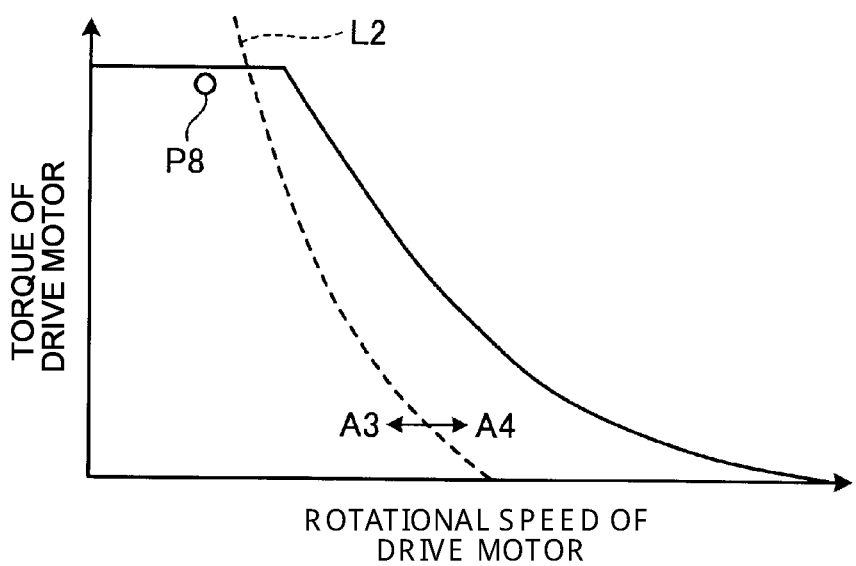
FIG. 14 is a view showing an operating point map of the drive motor when the operating point is located in the PWM control mode region.

When the HVECU 7 determines in step S3 that at least one of the generation motor MG1 and the drive motor MG2 is not in the rectangular wave control mode (NO in step S3), it determines whether the generation motor MG1 and the drive motor MG2 are both in the PWM control mode (step S10). For example, the HVECU 7 determines whether the operating point P5 of the generation motor MG1 is located in the PWM control mode region A1, as shown in FIG. 13, and the operating point P8 of the drive motor MG2 is located in the PWM control mode region A3, as shown in FIG. 14.

When the HVECU 7 determines that the inverter 5a for power generation and the inverter 5b for propulsion are both in the PWM control mode (YES in step S10), it changes the operating point of the generation motor MG1 from the PWM control mode region into the rectangular wave control mode region (step S11). For example, the HVECU 7 changes the operating point P5 of the generation motor MG1 located in the PWM control mode region A1, as shown in FIG. 13, to an operating point P6 located in the rectangular wave control mode region A2, along an equi-power curve L4.

When the inverter 5a for power generation and the inverter 5b for propulsion are both in the PWM control mode, the respective switching frequencies of the inverter 5a for power generation and the inverter 5b for propulsion are highly likely to be included in the second resonance frequency band of the capacitor 52, and the ripple current (the total value of the power-generation-side ripple amount and the drive-side ripple amount) of the capacitor 52 is highly likely to be equal to or larger than the predetermined value. Thus, the HVECU 7 changes the operating point P5 of the generation motor MG1 located in the PWM control mode region A1, to the operating point P6 located in the rectangular wave control mode region A2, so as to change the switching frequency of the inverter 5a for power generation, and prevent it from being included in the second resonance frequency band of the capacitor 52. This makes it possible to reduce the power-generation-side ripple current as compared with the case where the generation motor MG1 is operated at the operating point P5, thereby to reduce the ripple current of the capacitor 52.

Then, the HVECU 7 determines whether the ripple current of each of the battery 6 and the capacitor 52 has become smaller than the predetermined value, in the same manner as in step S1 and step S2, for example (step S12). When the HVECU 7 determines that the ripple current of each of the battery 6 and the capacitor 52 has become smaller than the predetermined value (YES in step S12), it finishes the control routine.

When the HVECU 7 determines that the ripple current of each of the battery 6 and the capacitor 52 has not become smaller than the predetermined value (NO in step S12), it determines whether the SOC of the battery 6 is equal to or higher than the predetermined level (step S13). When the HVECU 7 determines that the SOC of the battery 6 is equal to or higher than the predetermined level (YES in step S13), it reduces the amount of electric power generated by the generation motor MG1, and reduces the torque of the generation motor MG1 (step S14). For example, the HVECU 7 changes the operating point P6 of the generation motor MG1 located in the rectangular wave control mode region A2, as shown in FIG. 13, to an operating point P7, by reducing the torque without changing the rotational speed. This makes it possible to reduce the amount of electric power generated by the generation motor MG1, as compared with the case where the generation motor MG1 is operated at the operating point P6, and reduce the power-generation-side ripple current by an amount corresponding to reduction of the power generated, so that the ripple current of each of the battery 6 and the capacitor 52 can be reduced.

Then, the HVECU 7 determines whether the ripple current of each of the battery 6 and the capacitor 52 has become smaller than the predetermined value, in the same manner as in step S1 and step S2, for example (step S15). When the HVECU 7 determines that the ripple current of each of the battery 6 and the capacitor 52 has become smaller than the predetermined value (YES in step S15), it finishes the control routine. On the other hand, when the HVECU 7 determines in step S15 that the ripple current of each of the battery 6 and the capacitor 52 has not become smaller than the predetermined value (NO in step S15), it changes the operating point of the drive motor MG2 and reduces the driving force until the ripple current of each of the battery 6 and the capacitor 52 becomes smaller than the predetermined value (step S16), and finishes the control routine. Thus, by changing the switching frequency of the inverter 5b for propulsion, which depends on the rotational speed of the drive motor MG2, or reducing torque of the drive motor MG2 so as to reduce electric power supplied to the drive motor MG2, it is possible to reduce the drive-side ripple current, and thus reduce the ripple current of each of the battery 6 and the capacitor 52.

When the HVECU 7 determines in step S13 that the SOC of the battery 6 is not higher than the predetermined level (NO in step S13), it reduces the driving force by changing the operating point of the drive motor MG2, until the ripple current of each of the battery 6 and the capacitor 52 becomes smaller than the predetermined value (step S16), and then finishes the control routine. It is thus possible to make the ripple current of each of the battery 6 and the capacitor 52 smaller than the predetermined value, while curbing a shortage of the SOC of the battery 6 required to enable the hybrid vehicle 1 to travel with the driving force from the drive motor MG2.

Also, when the HVECU 7 determines in step S10 that one of the inverter 5a for power generation and the inverter 5b for propulsion is in the rectangular wave control mode, and the other is in the PWM control mode (NO in step S10), it reduces the driving force by changing the operating point of the drive motor MG2 until the ripple current of each of the battery 6 and the capacitor 52 becomes smaller than the predetermined value (step S16), and finishes the control routine.

When the HVECU 7 included in the controller of the vehicle according to this embodiment drives the generation motor MG1 and the drive motor MG2 at the same time, and the ripple current of each of the battery 6 and the capacitor 52 is equal to or larger than the predetermined value, the HVECU 7 changes drive control of at least one of the generation motor MG1 and the drive motor MG2. Thus, when the HVECU 7 according to this embodiment drives the generation motor MG1 and the drive motor MG2 at the same time, it can reduce the ripple current of each of the battery 6 and the capacitor 52, and reduce heat generated by the battery 6 and the capacitor 52.

In this embodiment, a current sensor may be provided for detecting the ripple current (the total value of the power-generation-side ripple current and drive-side ripple current) of each of the battery 6 and the capacitor 52. Then, when the HVECU 7 determines, based on the result of detection of the current sensor, that the ripple current of each of the battery 6 and the capacitor 52 is equal to or larger than the predetermined value, the HVECU 7 may change drive control of at least one of the generation motor MG1 and the drive motor MG2. In this manner, the HVECU 7 is able to grasp the ripple current of each of the battery 6 and the capacitor 52 with improved accuracy, as compared with the case where the power-generation-side ripple current and drive-side ripple current in the battery 6 and the capacitor 52 are estimated.

Figure 15:
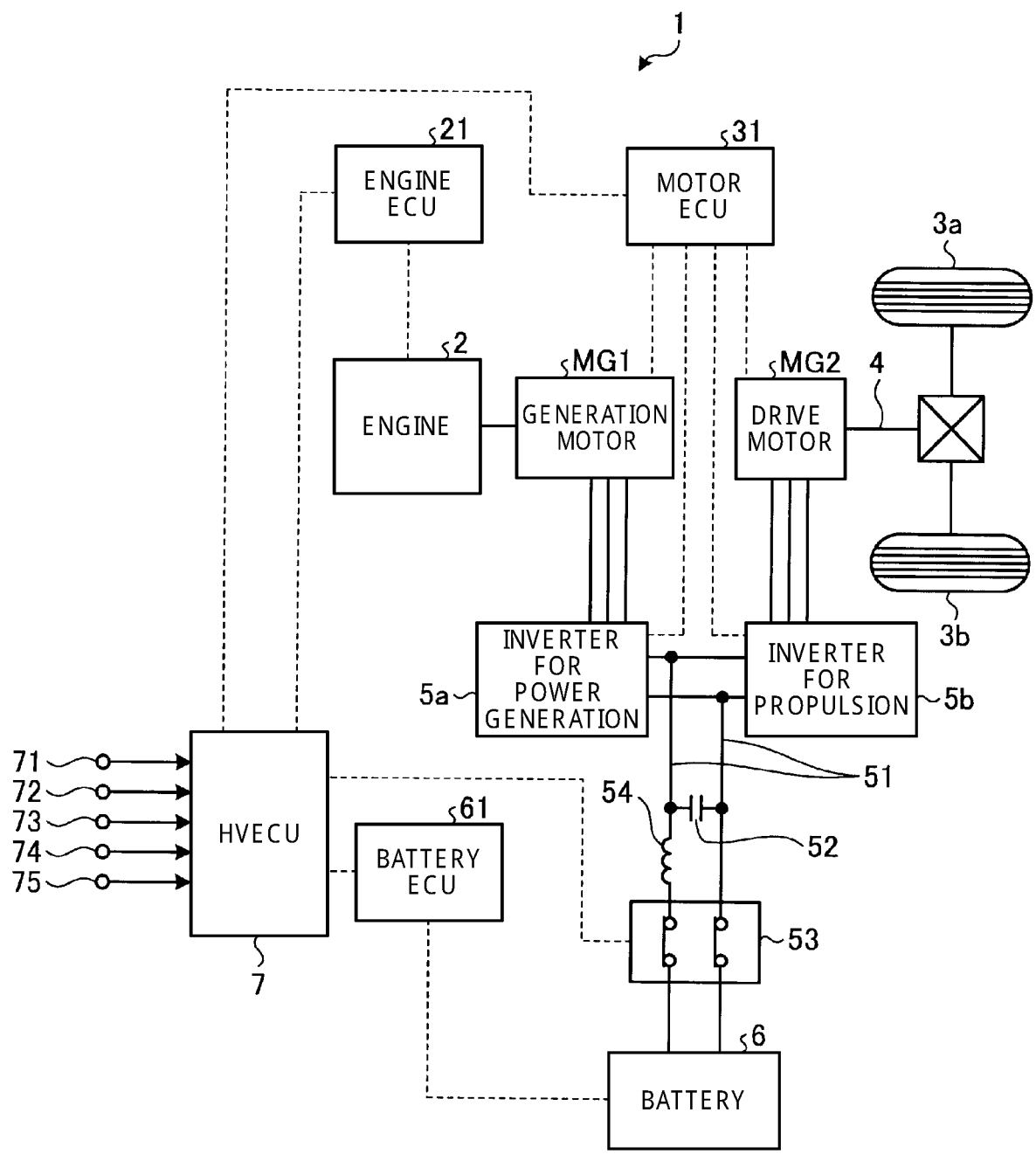
FIG. 15 is a schematic view showing another example of the configuration of the hybrid vehicle according to the embodiment.

The configuration of the hybrid vehicle 1 according to the embodiment is not limited to that shown in FIG. 1, in which the smoothing capacitors 52a, 52b are provided on the power generation side and the drive side, respectively. For example, as shown in FIG. 15, a single smoothing capacitor 52 may be connected in parallel with the power line 51, to be used on the power generation side and drive side. With the hybrid vehicle 1 thus configured as shown in FIG. 15, the HVECU 7 performs the control as illustrated in the flowchart of FIG. 10, for example, so as to reduce the ripple current of each of the battery 6 and the capacitor 52, and reduce heat generated in the battery 6 and the capacitor 52, when the generation motor MG1 and the drive motor MG2 are driven at the same time.

What is claimed is:

1. A controller installed on a vehicle including an engine, a first rotary electric machine for power generation which generates electric power using driving force from the engine, a second rotary electric machine for propulsion which delivers driving force for driving drive wheels, a power storage device, a first inverter for power generation which performs conversion of electric power between the first rotary electric machine and the power storage device, a second inverter for propulsion which performs conversion of electric power between the second rotary electric machine and the power storage device, and a circuit that has at least a capacitor and electrically connects the first inverter and the second inverter to the power storage device, the controller being adapted to perform drive control on the first rotary electric machine and the second rotary electric machine, the controller comprising a drive control changing unit configured to, when a total value of a power-generation-side ripple current and a drive-side ripple current is equal to or larger than a preset threshold value, change drive control of the first rotary electric machine such that the total value is reduced, the power-generation-side ripple current being generated according to an operating state of the first rotary electric machine and the drive-side ripple current being generated according to the operating state of the second rotary electric machine.

2. The controller according to claim 1, wherein:
the drive control changing unit is operable to change a control mode of switching control of the first inverter between a rectangular wave control mode and a pulse width modulation control mode according to a rotational speed of the first rotary electric machine;
the drive control changing unit is operable to change a control mode of switching control of the second inverter between the rectangular wave control mode and the pulse width modulation control mode according to the rotational speed of the second rotary electric machine; and
when the switching control of the first inverter and the switching control of the second inverter are both performed in the same control mode, the drive control changing unit is configured to change one of the control mode of the switching control of the first inverter and the control mode of the switching control of the second inverter such that the control mode of the first inverter does not match the control mode of the second inverter.

3. The controller according to claim 2, wherein:
the drive control changing unit is configured to change the control mode of the switching control of the first inverter to the pulse width modulation control mode, when the switching control of the first inverter and the switching control of the second inverter are both performed in the rectangular wave control mode; and
the drive control changing unit is configured to change the control mode of the switching control of the first inverter to the rectangular wave control mode, when the switching control of the first inverter and the switching control of the second inverter are both performed in the pulse width modulation control mode.

4. The controller according to claim 1, wherein the drive control changing unit is configured to change drive control of only the second rotary electric machine such that the total value is reduced, when a remaining capacity of the power storage device is smaller than a predetermined value.

5. The controller according to claim 4, wherein the drive control changing unit is configured to change an operating point of the second rotary electric machine such that driving force is reduced.

6. The controller according to claim 1, wherein the drive control changing unit is configured to prioritize change of drive control of the first rotary electric machine over change of drive control of the second rotary electric machine.

7. The controller according to claim 1, further comprising:
a power-generation-side map representing a relationship between an operating point of the first rotary electric machine and the power-generation-side ripple current, a drive-side map representing a relationship between an operating point of the second rotary electric machine and the drive-side ripple current; and
an estimating unit configured to estimate the power-generation-side ripple current from the power-generation-side map based on the operating point of the first rotary electric machine, and estimate the drive-side ripple current from the drive-side map based on the operating point of the second rotary electric machine, wherein the drive control changing unit is configured to use the power-generation-side ripple current and the drive-side ripple current estimated by the estimating unit.

\* \* \* \* \*